D. & T. DAVIS.
ANIMAL-TRAPS.

No. 180,852. Patented Aug. 8, 1876.

Witnesses;
Grenville Lewis
M. Church

Inventors
David Davis
Thomas Davis
By Hill, Elesworth & Spear
Their Attys.

UNITED STATES PATENT OFFICE.

DAVID DAVIS AND THOMAS DAVIS, OF SCRANTON, PENNSYLVANIA.

IMPROVEMENT IN ANIMAL-TRAPS.

Specification forming part of Letters Patent No. 180,852, dated August 8, 1876; application filed June 24, 1876.

*To all whom it may concern:*

Be it known that we, DAVID DAVIS and THOMAS DAVIS, of Scranton, in the county of Luzerne and State of Pennsylvania, have invented a new and Improved Animal-Trap; and we do hereby declare the following to be a full, clear, and exact description of the same, reference being had to the accompanying drawings, forming part of this specification.

This invention relates to animal-traps; and consists of certain details of construction, which will be hereinafter more fully set forth.

Figure 1:
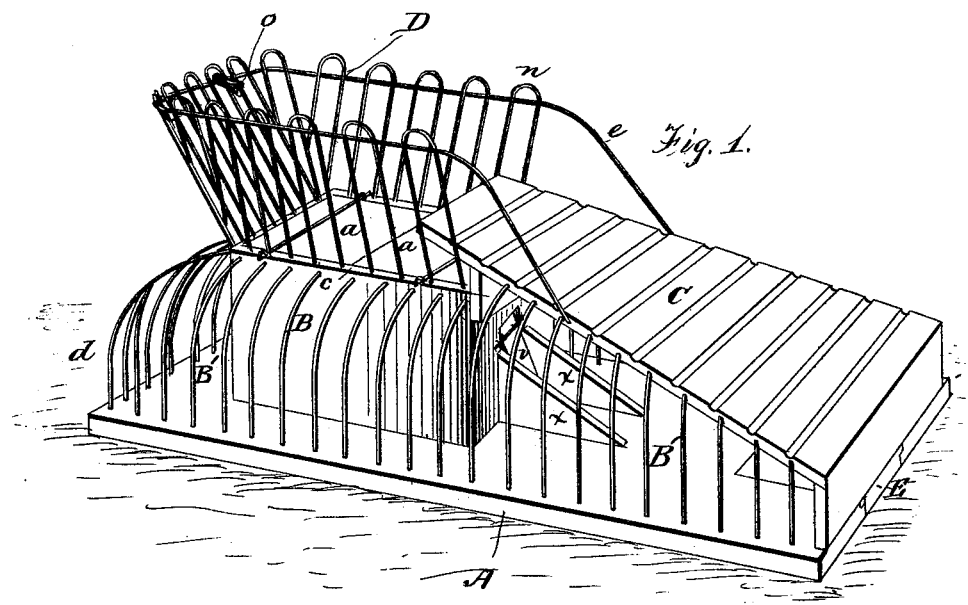
Figure 2:
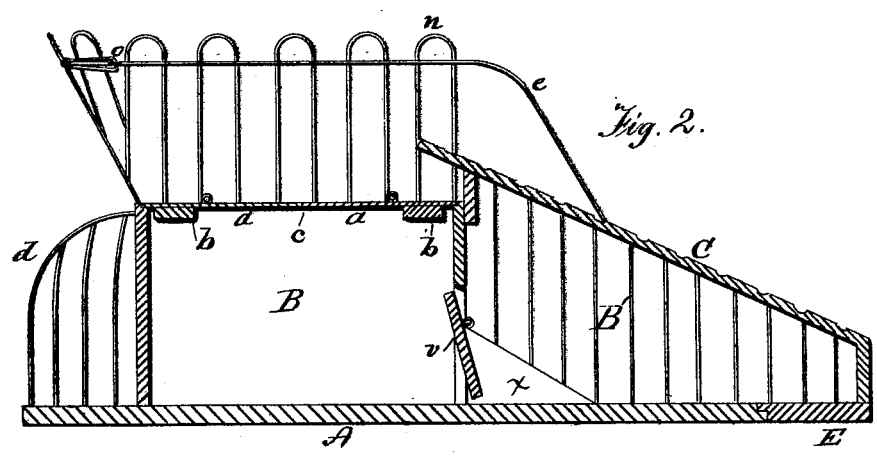

The trap is composed of a board, which forms its bottom or base, marked in the drawings A; of a box, B, located thereon, a space, B′, around said box, of suitable wire-work, inclosing said space; and of an inclined way, C, leading to the valves or tilting platforms *a a*, which are on the top of the box B, and within the inclosure D. The valves or tilting platforms *a a* on the top of the box are pivoted near their outer ends, and the short outer ends are weighted, as shown more clearly at *b b*, Fig. 2. These weights should sustain such relations to the longer ends of the valves that, when these longer ends have been depressed, and thereby an opening made into the interior of the box, the weights shall automatically bring the valves back to a horizontal position, and thus close the box.

The valves meet at the center, at the point indicated by the letter *c*, and, as is obvious from the figures, swing inward when depressed. The outer or weighted ends rest upon the edge of the box, so as to remain firmly and evenly in place.

From the forward end of the trap the inclined way C extends, gradually narrowed, so as to enter the inclosure and project over one of the valves, elevated at some distance above it.

The box B is surrounded by a space, B′, inclosed with a wire grating, *d*, extending from the outer edge of the bottom board to the upper edge of the box B, and to the inclined way C. The ends of the wires are bent, so as to be conveniently inserted into the box and inclined way.

The valves on the top of the box are surrounded by another grating or fence of wire, heretofore mentioned. It is composed of a single wire, *e*, bent as shown in the drawing, and the ends attached to the edge of the inclined way. Attached to this are wires *n n*, the lower ends of which are inserted in the top of the box B. These, like the wires which form the grating below, may be of any suitable size or number, and may be extended to any suitable height, depending on the size of the animal which the trap is intended to catch. Attached to the fence that surrounds the valve is a bait-holder, *o*, which may be of any suitable length, and may extend forward any proper distance over the trap-doors.

In front of the box B is provided a hinged door leading out into the space B′, under the inclined way, and around said box B. This door, marked in the drawings *v*, is hung a little off its center and near its upper edge, so as to hang, in its normal position, slightly open, so as to invite the animal out of the darkened box into the lighter part of the trap. At the same time the door is so hung as to prevent his return. The door swings between two side boards, *x x*, which guard against any opening of the door from the outside.

The part above the hinge must be too small to admit the animal at that point. A sliding door, E, is provided in the front part of the box, for the purpose of removing animals from the trap.

The action of the trap is obvious from the description. The valves are inaccessible except from the inclined way, and the animal approaching by that way will find himself balanced on the edge which projects over the valves or over one valve. In springing for the bait his weight will be thrown upon the valves, and he will fall through into the box below, the valves closing after him. From this there is no escape except through the door *v*. The trap thus remains self-set. It will also be obvious that this trap is very simple in its construction, easily and cheaply made, and not liable to get out of repair.

We are aware that animal-traps have been before known provided with valves, a surrounding guard, and an inclined way leading thereto, and we make no claim, broadly, to such a trap.

We claim as our invention—

In an animal-trap, the inner box B, provided with tilting platforms $a\ a$, and door $v$, in combination with the outer space B', inclosed by the wire grating $d$, the inclined way C, and wire guard $e\ n$, all constructed and arranged substantially as for the purpose set forth.

DAVID DAVIS.
THOMAS DAVIS.

Witnesses:
JAMES S. WILLIAMS,
SAMUEL D. SCHOOLEY.